US010819777B1

(12) United States Patent
Nienaber

(10) Patent No.: US 10,819,777 B1
(45) Date of Patent: Oct. 27, 2020

(54) FAILURE ISOLATION IN A DISTRIBUTED SYSTEM

(71) Applicant: Amazon Technologies, Inc., Seattle, WA (US)

(72) Inventor: M. Paul Nienaber, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 36 days.

(21) Appl. No.: 16/188,517

(22) Filed: Nov. 13, 2018

(51) Int. Cl.
*H04L 29/08* (2006.01)
*G06Q 30/06* (2012.01)
*H04L 12/927* (2013.01)
*H04L 12/24* (2006.01)

(52) U.S. Cl.
CPC ..... *H04L 67/1034* (2013.01); *G06Q 30/0603* (2013.01); *H04L 41/0686* (2013.01); *H04L 47/803* (2013.01); *H04L 67/025* (2013.01); *H04L 67/16* (2013.01); *H04L 67/325* (2013.01)

(58) Field of Classification Search
CPC ............. H04L 67/1034; H04L 41/0686; H04L 47/803; H04L 67/025; G06Q 30/0603
See application file for complete search history.

(56) References Cited

U.S. PATENT DOCUMENTS 9,065,762 B2   6/2015  Ryu et al.
9,158,837 B2  10/2015  Gedik et al.
9,755,985 B1   9/2017  Lutz et al.
2013/0051234 A1* 2/2013 Matsuoka ............... H04L 47/25
                                                        370/235
2017/0359411 A1* 12/2017 Burns ................. H04L 67/1002
2018/0270305 A1*  9/2018 Tignor ................ H04L 67/1008
2019/0386884 A1* 12/2019 Qi ........................... H04L 47/26

FOREIGN PATENT DOCUMENTS

CN        109960212 A   *  7/2019

OTHER PUBLICATIONS

Zhou et al, Overload Control for Scaling WeChat Microservices, Association for Computing Machinery, SoCC '18, Oct. 11-13, 2018, p. 149-161 (Year: 2018).*
Lee et. al, A Proportional-Delay DiffServ-Enabled Web Server: Admission Control and Dynamic Adaptation, IEEE Transactions on Parallel and Distributed Systems, vol. 15, No. 5, p. 385-400 (Year: 2004).*

(Continued)

*Primary Examiner* — Jeffrey R Swearingen
(74) *Attorney, Agent, or Firm* — Robert C. Kowert; Kowert, Hood, Munyon, Rankin & Goetzel, P.C.

(57) ABSTRACT

Methods, systems, and computer-readable media for failure isolation in a distributed system are disclosed. An operation is initiated at a first service in a distributed system. The operation is dependent on a plurality of requests to one or more services including a second service, and the requests are associated with a key. A keyspace comprising an ordered set of potential key values is partitioned into a first partition and a second partition, where the first partition represents potential key values to be subjected to deliberate request shedding. The key associated with the requests is mapped to the first partition. The requests to the second service are discarded based at least in part on the mapping, and the operation associated with the key fails at the first service.

20 Claims, 13 Drawing Sheets

(56) References Cited

OTHER PUBLICATIONS

Xiaolan Hu, "Simulation of Quality of Service (QoS) Graph-Based Load-Shedding Algorithm in Aurora System Using CSIM," Brown University, May 2002, pp. 1-32.
Nesime Tatbul et al, "Load Shedding in a Data Stream Manager," Proceedings of the 2003 VLDB Conference, pp. 309-320, 2003.
Emine Nesime Tatbul et al, "Load Shedding Techniques for Data Stream Management Systems," Brown University, May 2007, pp. 1-150.
Kris Beevers, "Load Shedding: Five Reasons it Matters for Your Applications," DataCenterKnowledge.com, Aug. 2015, pp. 1-4.

* cited by examiner

FAILURE ISOLATION IN A DISTRIBUTED SYSTEM

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

Web servers backed by distributed systems may provide stores that offer goods and/or services to consumers. For instance, consumers may visit a merchant's website to view and purchase goods and services offered for sale by a set of vendors. Some web-accessible stores include large electronic catalogues of items offered for sale. For each item, such electronic catalogues typically include at least one product detail page that specifies various information about the item, such as a description of the item, one or more pictures of the item, as well as specifications (e.g., weight, dimensions, capabilities) of the item. In various cases, such stores may rely on a service-oriented architecture to implement various business processes and other tasks. The service-oriented architecture may be implemented using a distributed system that includes many different computing resources and many different services that interact with one another, e.g., to produce a product detail page for consumption by a client of a web server.

Figure 1A:
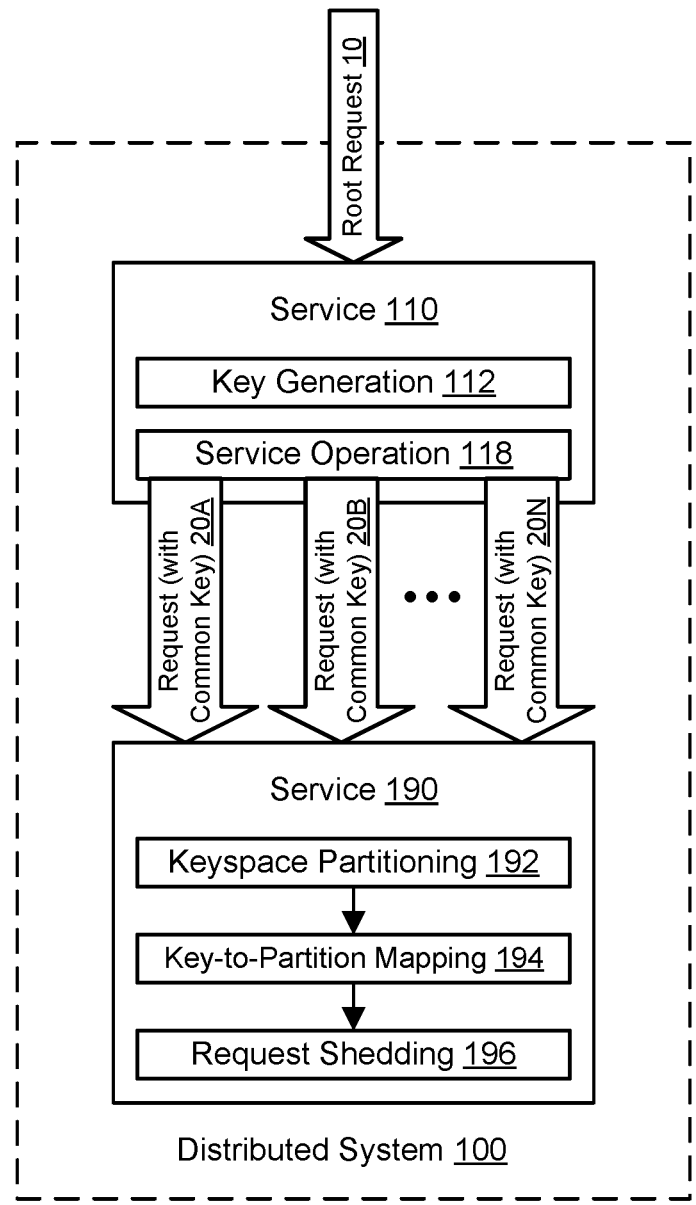
FIG. 1A, FIG. 1B, and FIG. 1C illustrate an example system environment for failure isolation in a distributed system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for failure isolation in a distributed system are described. In a distributed system or a system with multiple modules that collaborate via requests, an upstream service may be dependent on a downstream service if the upstream service issues requests to the downstream service that must be successfully completed in order for the upstream service to complete its own operations successfully. Using prior approaches, a small degradation in a service dependency could cause a magnified impact at upstream services. For example, if a downstream service is dropping 2% of requests due to heavy traffic, but an upstream service typically makes fifty or more requests to the downstream service in performing a single higher-level operation, then a much larger percentage of the higher-level operations will fail. Using the techniques described herein, higher-level failures in such a system may be limited by coalescing failures at a lower level of the dependency chain. For example, if the downstream service has to drop 2% of requests due to heavy traffic, then those requests may be selected intelligently rather than randomly, such that approximately 2% of higher-level operations will fail at the upstream service.

In one embodiment, multiple requests from an upstream (higher-level) service or module to a downstream (lower-level) service or module may be associated with a common key for a particular higher-level operation. The key may be based on the request ID of a root request, on a timestamp of the root request, or on any other suitable metadata. The key may be included with the requests to the downstream service or may instead be determined using a call to an external service. The value of the key may have a position within an ordered keyspace of potential key values. The keyspace may be divided into at least two partitions: one partition representing requests to be deliberately dropped, and another partition representing requests to be attempted. When a service seeks to drop a percentage of its requests in order to maintain availability for the remaining requests, the service may partition requests into the two or more partitions based (at least in part) on the per-operation keys. The sizes of the partitions or the position of the partition boundary within the ordered keyspace may vary based (at least in part) on the amount of requests that are sought to be deliberately shed. For example, if the service seeks to deliberately shed 2% of its traffic, then 2% of the keys may be selected from the keyspace (in a contiguous range, e.g., at the top or bottom of the ordered keyspace). Requests with the selected keys may be discarded, and the upstream operations for those requests may fail. However, the failures at the upstream service may be limited to approximately the same percentage as the failures at the downstream service.

As one skilled in the art will appreciate in light of this disclosure, embodiments may be capable of achieving certain technical advantages, including some or all of the following: (1) reducing the number of failed upstream operations in a distributed system or a system with multiple modules that collaborate via requests; (2) improving the availability of a service experiencing heavy traffic by deliberately shedding some traffic while permitting a large percentage of upstream operations to succeed; (3) improving the availability of a service for higher-priority operations by deliberately shedding requests for lower-priority operations at downstream services; (4) improving usage of network resources and computational resources by limiting or delaying retries of failed requests; (5) containing the external impact of a service "brownout" at upstream services to the availability of the most heavily impacted downstream service; and so on.

Figure 1B:
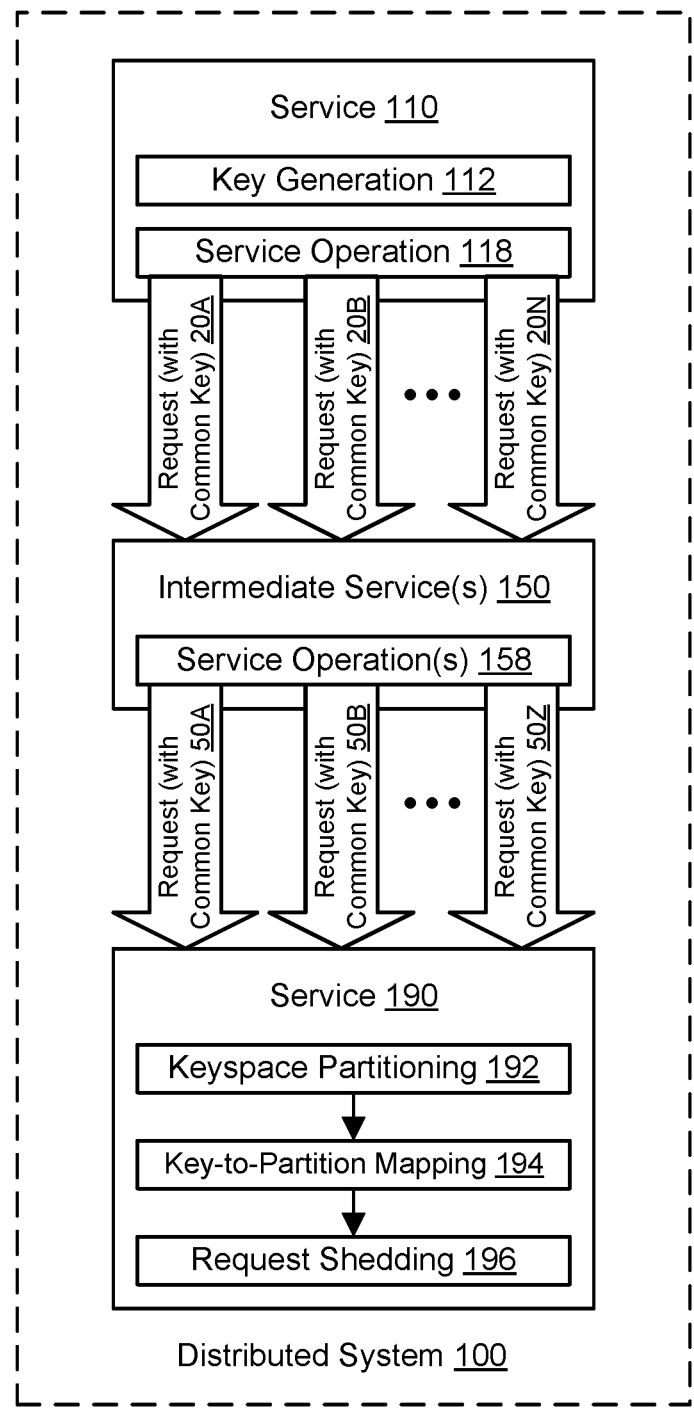
Figure 1C:
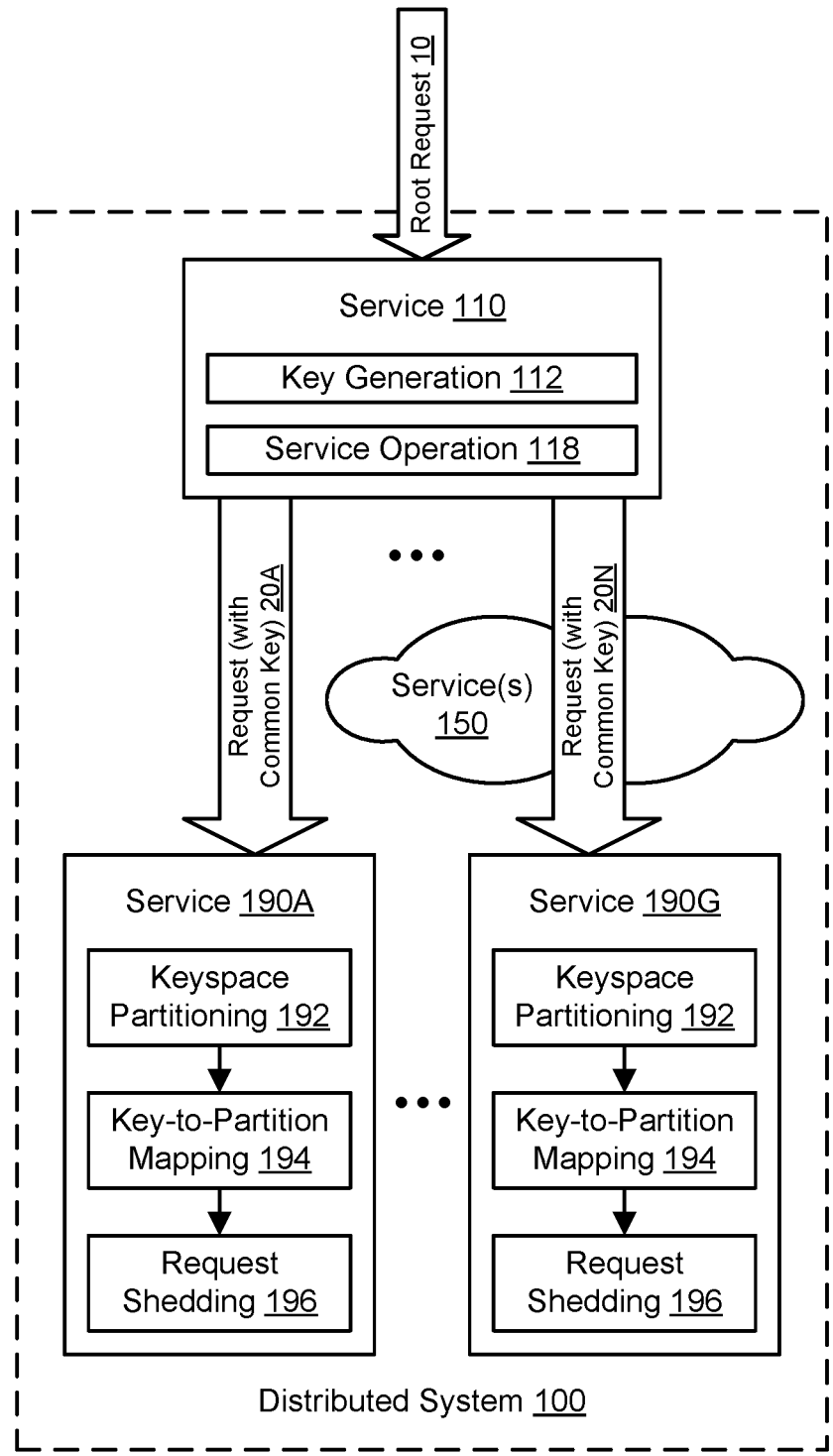

FIG. 1A, FIG. 1B, and FIG. 1C illustrate an example system environment for failure isolation in a distributed system, according to some embodiments. A distributed system 100 may include multiple components, such as services or modules, that collaborate to perform complex tasks. A distributed system 100 may implement a service-oriented architecture such that multiple services are configured to communicate with each other (e.g., through message passing) to carry out various tasks. As shown in the example of FIG. 1A, the system 100 may include an upstream service 110 and a downstream service 190. As shown in the example of FIG. 1B, the system 100 may also include one or more intermediate services 150. Although the services 110, 150, and 190 are illustrated for purposes of example, it is contemplated that any suitable number of services may be used with the distributed system 100. Each of the services 110, 150, and 190 may represent one or more service instances. Each of the services 110, 150, and 190 may be implemented using one host or a plurality of hosts, any of which may be implemented by the example computing device 3000 illustrated in FIG. 8. The hosts may be located in any suitable number of data centers or geographical locations. In one embodiment, multiple services and/or instances of the same service may be implemented using the same host.

Each of the services 110, 150, and 190 may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. In some embodiments, services may be loosely coupled in order to minimize (or in some cases eliminate) interdependencies among services. This modularity may enable services to be reused in order to build various applications through a process referred to as orchestration. A service may include one or more components that may also participate in the distributed system, e.g., by passing messages to other services or to other components within the same service. A service may offer one or more application programming interfaces (APIs) or other programmatic interfaces through which another service may request the functionality of the service.

The distributed system 100 may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system (such as another service in the distributed system 100) may submit a request for a web service (e.g., a data storage service, a data query, etc.). In general, services may be configured to perform any of a variety of processes. As shown in FIG. 1A and FIG. 1B, an initial request into the distributed system 100 may be termed a root request 10.

The services 110, 150, and 190 may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

Services at different layers of the system 100 may interact in satisfying a particular initial request, e.g., as indicated by a set of call paths between services or APIs. The call paths may represent inbound service requests and outbound service requests relative to a particular service or API. To process a given received request at one service, one or more other services may be invoked. As used herein, an initial request 10 may be referred to as the "root request." In various embodiments, the root request 10 may but need not originate from a computer system outside of the distributed system 100. In some embodiments, a root request 10 may be received by an initial service such as service 110, which may then call APIs of one or more other services. Additionally, each of those services may also call APIs of one or more other services, those services may respond appropriately, and so on, until the root request 10 is completely fulfilled by its initial recipient service 110.

The upstream service 110 may be configured to perform a particular operation 118, e.g., in response to the root request 10 or to another request from a further upstream entity. For example, the service 110 may be configured to build a web page or a portion of a web page, e.g., as part of an online store that offers descriptions of goods and services for sale or lease. As shown in the example of FIG. 1A, the upstream service 110 may issue multiple requests 20A and 20B through 20N to the downstream service 190 for the same upstream operation 118. With respect to the operation 118, the upstream service 110 may be said to be dependent on the downstream service 190. In one embodiment, the operation 118 may fail if any of the requests 20A-20N are not completed successfully within a particular window of time.

As shown in the example of FIG. 1B, the upstream service 110 may issue the multiple requests 20A and 20B through 20N to one or more of the intermediate services 150, and to serve those requests by performing one or more operations 158, one or more of the intermediates services may issue multiple requests 50A, 50B, and 50Z to the downstream service 190. In one embodiment, the number of requests 50A-50Z may be greater than or equal to the number of requests 20A-20B. In one embodiment, any number of layers of intermediate services 150 may be invoked between the service 110 and the service 190 in performing the higher-level operation 118. With respect to the operation 118, the upstream service 110 may be said to be dependent on the intermediate service(s) 150 as well as the downstream service 190. In one embodiment, the operation 118 may fail if any of the requests 20A-20N and 50A-50Z are not completed successfully within a particular window of time.

As shown in the example of FIG. 1C, the upstream service 110 may issue requests 20A-20N to a plurality of downstream services, such that the operation 118 may be dependent on the successful completion of the requested tasks at the multiple services. For example, the downstream services may include service 190A through 190G. Each of the services 190A-190G may implement the same logic for key partitioning 192 and request shedding 196. Using the key partitioning 192 and request shedding 196 logic at the different services 190A-190G, requests belonging to the same upstream operation may be identified and deliberately discarded in a similar manner. In one embodiment, the requests 20A-20N (and responses to those requests) may be sent over one or more networks. In one embodiment, various requests 20A-20N may take different paths through a service stack in order to reach their recipient services 190A-190G, and the paths may vary in the number of service layers or hops. For example, request 20A may be sent directly from service 110 to service 190A, while request 20N may be sent through one or more intermediate services 150 (and may be transformed by those services, e.g., by the intermediate services issuing additional requests) before arriving at the service 190G.

Using prior approaches, a small degradation of availability at the downstream service 190 could cause a much larger degradation of availability at the service(s) 150 and service 110 due to the one-to-many relationship of upstream operations to downstream tasks associated with those operations. Using the techniques described herein, such higher-level failures may be limited by coalescing failures at a lower level of the dependency chain and performing intelligent request shedding. For example, if the service 190 has to drop 2% of requests due to heavy traffic, then those requests may be selected intelligently rather than randomly (or pseudo-randomly), such that approximately 2% of higher-level operations will fail at the service 110 instead of a much higher percentage of the higher-level operations. To achieve these advantages, the system 100 may implement techniques for failure isolation. In one embodiment, the failure isolation may be initiated manually, e.g., by an administrator or service owner who observes or anticipates heavy traffic at one or more service layers. In one embodiment, the failure isolation may be initiated automatically, e.g., by a component of the system 100 that observes or anticipates heavy traffic at one or more service layers. In one embodiment, the intelligent request shedding may be initiated based (at least in part) on one or more performance metrics at a service or other component of the system 100, including usage that exceeds a predetermined threshold. For example, intelligent request shedding may be initiated for a service if the transactions per second (TPS) at the service exceed a threshold. The intelligent request shedding may be used to improve the performance of a distributed system by shedding some (but not all) traffic at downstream services while allowing a large percentage of upstream operations to succeed.

In one embodiment, one or more of the services 110, 150, and 190 may be configured with one or more components for performing the failure isolation. The upstream service 110 may include a component 112 for key generation. Using the key generation 112, the service 110 may generate an operation-specific key for the operation 118 and for all of the requests 20A-20N and 50A-50Z that are issued to downstream services in performing the higher-level operation. The key may be generated based (at least in part) on metadata associated with the operation 118. For example, the key may be generated using all or part of the request identifier of a root request 10 or other upstream call that invoked the operation 118. As another example, the key may be generated using a timestamp of the root request 10 or other upstream call that invoked the operation 118. In one embodiment, the key may be generated using a hash function applied to the request ID or timestamp. In one embodiment, the key may be generated by extracting a segment of the request ID. In one embodiment, the key may be generated using per-operation metadata that tends to be evenly distributed across the broader set of operations performed by the service 110.

Values of the generated keys may belong to a keyspace that holds all the potential values for keys. The values in the keyspace may be sortable or otherwise suitable for ordering such that a particular key value corresponds to a particular position in the keyspace relative to other potential values. For example, the ordered keyspace may include the potential values A, B, C, D, E, and so on, through Z. As another example, the ordered keyspace may include a set of numerals such as 1 through 1024. Similarly, the keyspace may include a set of alphanumeric values that can be ordered in a conventional manner. Keys assigned to different operations may not necessarily be unique, but the keyspace may include enough potential values to successfully distinguish an operation from most other operations for purposes of deliberate load shedding. In one embodiment, the same key may be added to each of the requests 20A-20N and propagated in-band throughout the dependency chain. In one embodiment, the same key may also be added to each of the requests 50A-50Z.

When the downstream service 190 receives a request, the service may decide whether or not to deliberately shed the request using the key associated with the request. Shedding a request may include dropping the request, discarding the request, disregarding the request, or otherwise making a deliberate decision not to perform the requested task(s). Requests that are deliberately shed may be distinct from requests that fail due to actual failure of the service operation. To inform the deliberate request shedding 196, the downstream service 190 may include a component 192 for keyspace partitioning and a component 194 for key-to-partition mapping. As shown in FIG. 1A, the keyspace partitioning 192 may partition the keyspace into two or more partitions, such as one partition representing requests to be deliberately dropped and another partition representing requests to be attempted, and the key-to-partition mapping 194 may then determine the partition to which the common key for the requests 20A-20N belongs. As shown in FIG. 1B, the keyspace partitioning 192 may partition the keyspace into two or more partitions, such as one partition representing requests to be deliberately dropped and another partition representing requests to be attempted, and the key-to-partition mapping 194 may then determine the partition to which the common key for the requests 50A-50Z belongs. A key may be mapped to a position within the keyspace and thus to a particular partition of that keyspace. The sizes of the partitions or the position of the partition boundary within the keyspace may vary based (at least in part) on the amount or percentage of requests to be shed deliberately. For example, if 2% of requests are sought to be dropped, then a contiguous range of 2% of the potential values on one end of the ordered keyspace may represent the partition of values to be dropped, and the remaining 98% of potential values may represent the partition of values to be retained. If usage increases or decreases, then the 2% range of potential values may be expanded or contracted appropriately.

After the keyspace has been partitioned, the key-to-partition mapping 194 may map the key for an incoming request into one of the partitions of the ordered keyspace. If a key is mapped into the partition of keyspace values to be dropped, then the corresponding request(s) may be subjected to request shedding 196. On the other hand, if a key is mapped into the partition of keyspace values to be kept, then the corresponding request(s) may not be subjected to request shedding 196 and may instead be attempted. Other services in the system 100 may use the same partitioning 192 and mapping 194 logic to reach the same decisions regarding which higher-level operations to disregard. By replicating the same decision-making for failure isolation throughout multiple service layers, the impact of heavy traffic on a lower-level service may not be magnified at higher-level services that are dependent numerous times per higher-level operation on the lower-level service.

Figure 8:
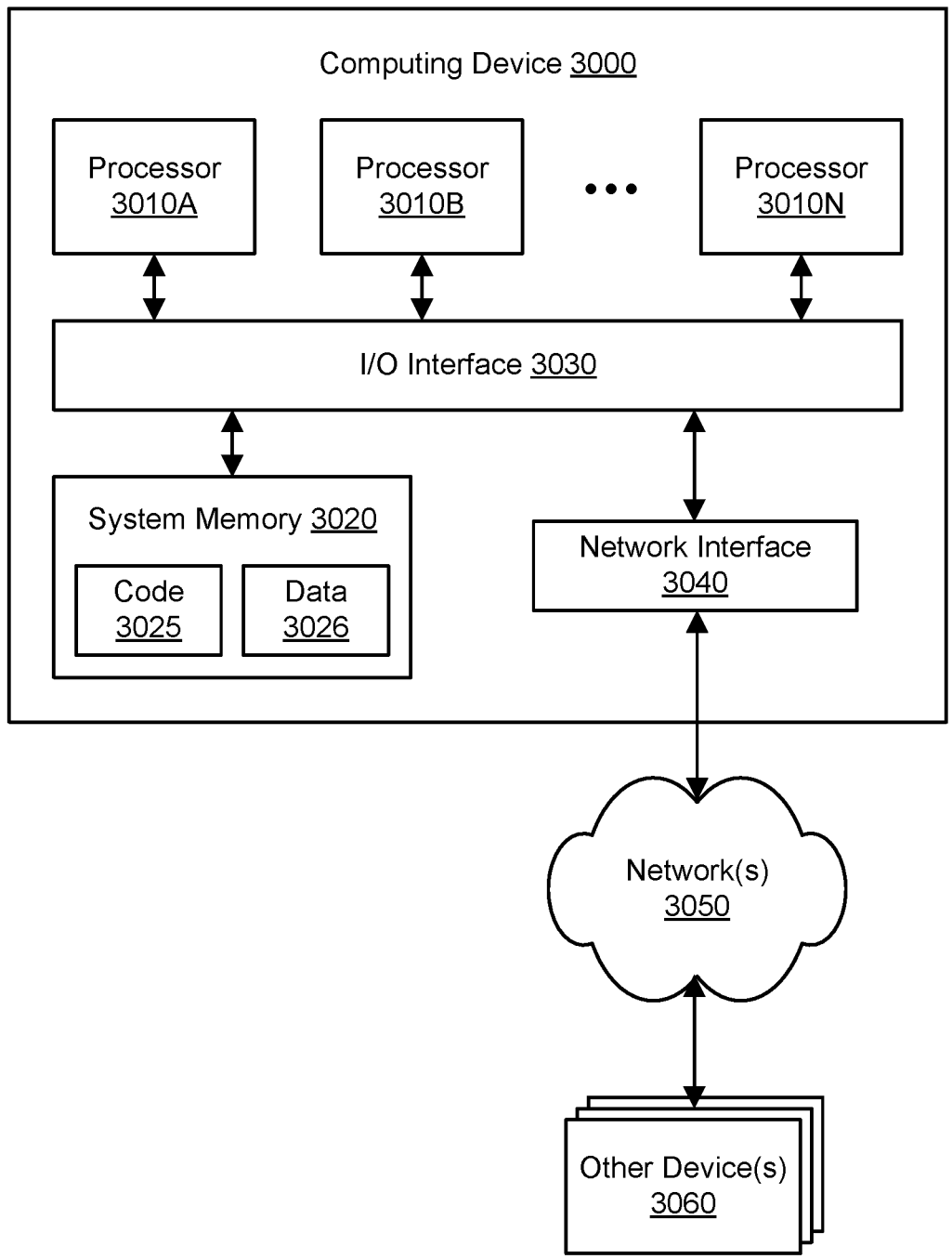
FIG. 8 illustrates an example computing device that may be used in some embodiments.

The distributed system 100 may include one or more computing devices, any of which may be implemented by the example computing device 3000 illustrated in FIG. 8. In various embodiments, the functionality of the different services, components, and/or modules of the distributed system 100 may be provided by the same computing device or by different computing devices. If any of the various components are implemented using different computing devices, then the respective computing devices may be communicatively coupled, e.g., via a network. Each of the components of the distributed system 100 may represent any combination of software and hardware usable to perform their respective functions, as discussed as follows. Functions implemented by the distributed system 100, such as the key generation 112, keyspace partitioning 192, key-to-partition mapping 194, and request shedding 196, may be performed automatically, e.g., without a need for user initiation or user intervention after an initial configuration stage, and programmatically, e.g., by execution of program instructions on at least one computing device. In one embodiment, aspects of the distributed system 100, including the key generation 112, keyspace partitioning 192, key-to-partition mapping 194, and request shedding 196, may be performed repeatedly over time. The distributed system 100 may include additional components not shown, fewer components than shown, or different combinations, configurations, or quantities of the components shown.

A service in the distributed system 100 may be implemented using a plurality of different instances that are distributed throughout one or more networks, and each instance may offer access to the functionality of the corresponding service to various clients, including other services. It is contemplated that any suitable number and configuration of clients may interact with the services of the distributed system 100. Services of the distributed system 100 may convey network-based service requests to one another via one or more networks. In various embodiments, the network(s) may encompass any suitable combination of networking hardware and protocols necessary to establish network-based communications between two services. For example, the network(s) may generally encompass the various telecommunications networks and service providers that collectively implement the Internet. The network(s) may also include private networks such as local area networks (LANs) or wide area networks (WANs) as well as public or private wireless networks. For example, two services may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between a first service and the Internet as well as between the Internet and a second service. In some embodiments, services may communicate with one another using a private network rather than the public Internet.

In one embodiment, aspects of the distributed system 100 may be implemented using computing resources of a provider network. A provider network may represent a network set up by an entity such as a company or a public-sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

In some embodiments, an operator of the provider network may implement a flexible set of resource reservation, control, and access interfaces for their clients. For example, a resource manager may implement a programmatic resource reservation interface (e.g., via a web site or a set of web pages) that allows clients (potentially including other components within the provider network) to learn about, select, purchase access to, and/or reserve compute instances offered by the provider network. Such an interface may include capabilities to allow browsing of a resource catalog and provide details and specifications of the different types or sizes of resources supported, the different reservation types or modes supported, pricing models, and so on.

Figure 2A:
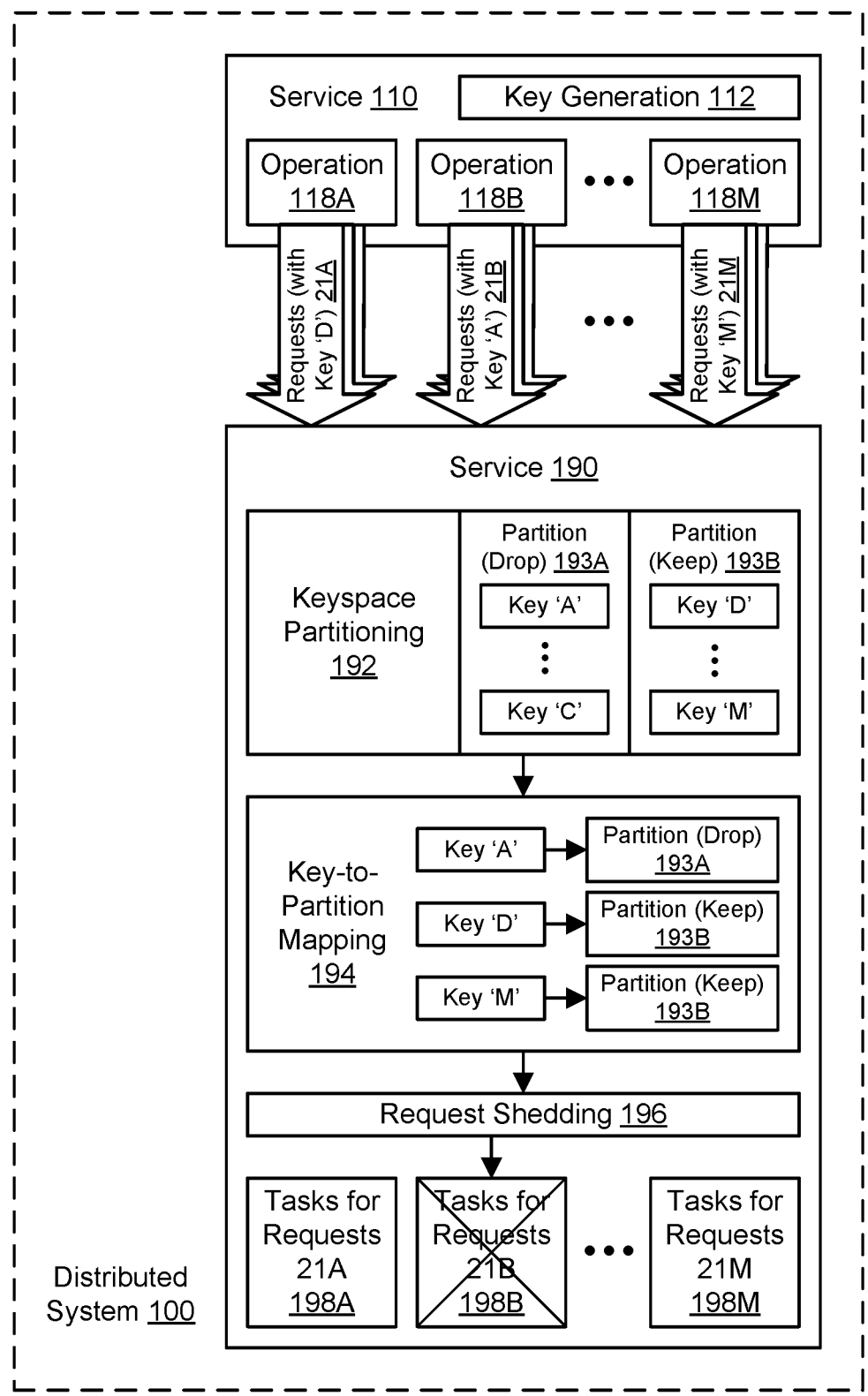
FIG. 2A illustrates further aspects of the example system environment for failure isolation in a distributed system, including the mapping of a key into a partition of key values to be deliberately shed, according to one embodiment.

FIG. 2A illustrates further aspects of the example system environment for failure isolation in a distributed system, including the mapping of a key into a partition of key values to be deliberately shed, according to one embodiment. Over time, an upstream service 110 may attempt to perform several operations such as operations 118A and 118B through 118M. The service 110 may issue multiple downstream requests for each of the operations 118A-118M. The requests for a particular operation may share the same sortable key. As shown in FIG. 2A, the service may issue multiple requests 21A with key for operation 118A, multiple requests 21B with key 'A' for operation 118B, and multiple requests 21M with key 'M' for operation 118M. The requests 21A, 21B, and 21M may be received by the downstream service in any order and over any suitable period of time. The service 190 may perform the keyspace partitioning 192 at any time before or after receiving the requests 21A-21M, e.g., when the decision is made to perform request shedding 196. As shown in FIG. 2A, the potential values in the keyspace may be sorted or ordered, e.g., such that key 'A' is at the top of the order, key 'B' is next, and key 'M' is at the bottom of the order.

The ordered keyspace may then be partitioned into a first partition 193A representing keys for requests to be deliberately dropped and a second partition 193B representing keys for requests to be kept and not deliberately dropped. As shown in the example of FIG. 2A, the "drop" partition 193A may represent potential key values 'A' through 'C," while the "keep" partition 193B may represent potential key values 'D' through 'M.' The sizes of the partitions or the position of the partition boundary within the keyspace may vary based (at least in part) on the amount or percentage of requests to be shed deliberately. For example, if 2% of requests are sought to be dropped, then a contiguous range of 2% of the potential values at the top of the ordered keyspace may represent the partition 193A of values to be dropped, and the remaining 98% of potential values may represent the partition 193B of values to be retained.

When a request is received, the key-to-partition mapping 194 may determine the partition to which the key belongs. As shown in the example of FIG. 2A, the key 'A' may be mapped to the "drop" partition 193A, while the keys 'D' and 'M' may be mapped to the "keep" partition 193B. As a result of the selection of key 'A,' the request shedding 196 may be performed for all of the requests 21B. Thus the tasks 198B corresponding to the requests 21B may not be performed. However, the tasks 198A corresponding to requests 21A may be attempted and then performed successfully, and the tasks 198M corresponding to requests 21M may be attempted and then performed successfully. In one embodiment, the request shedding 196 may be performed based (at least in part) on priority levels of the requests, of their corresponding operations, of the users associated with the root requests, etc. For example, keys at a lower level of priority may be shed before any keys at a higher level of priority are selected.

Figure 2B:
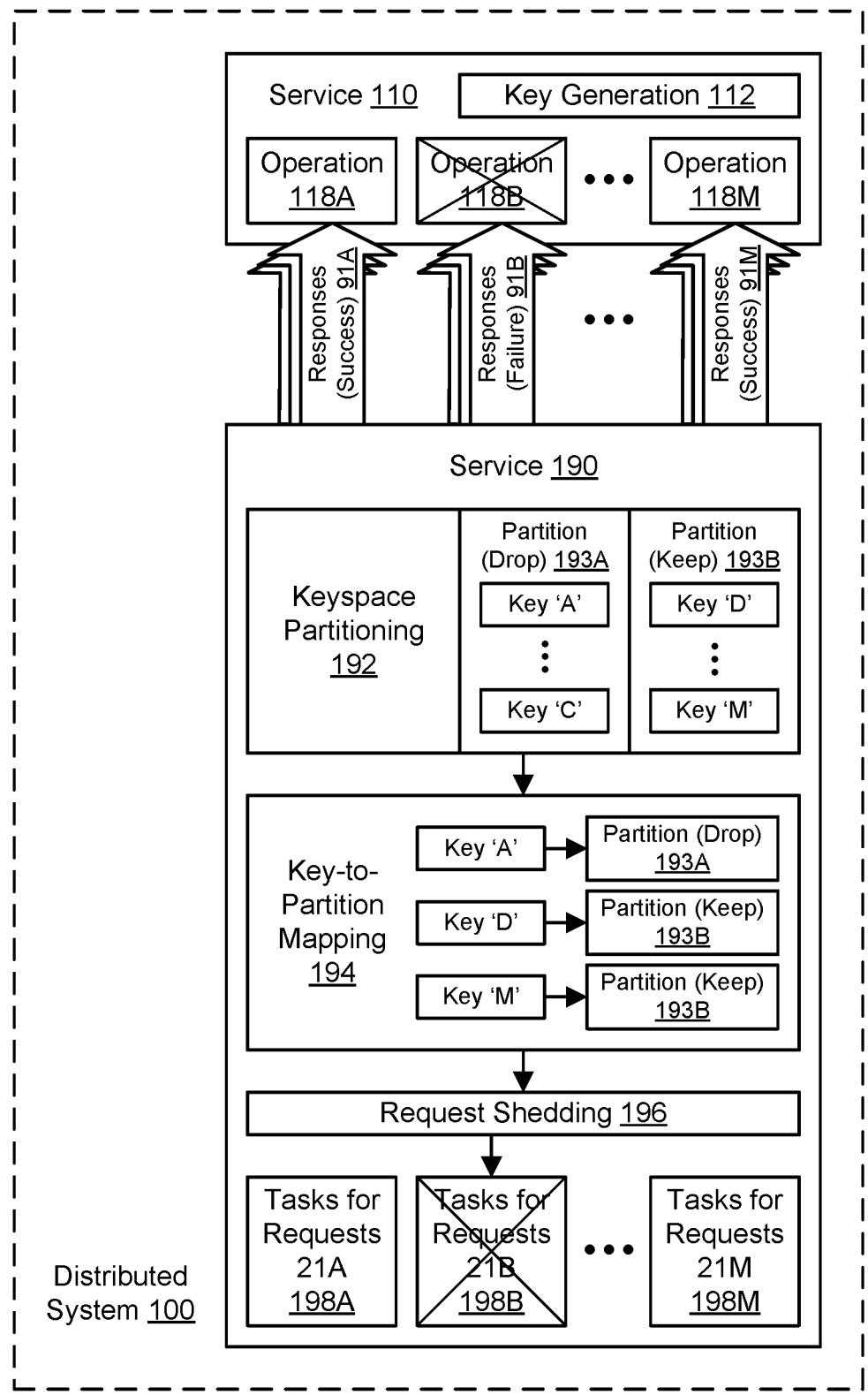
FIG. 2B illustrates further aspects of the example system environment for failure isolation in a distributed system, including the isolation of failure at a higher level to one operation based (at least in part) on the key mapping, according to one embodiment.

FIG. 2B illustrates further aspects of the example system environment for failure isolation in a distributed system, including the isolation of failure at a higher level to one operation based (at least in part) on the key mapping, according to one embodiment. The service 190 may issue responses to the requests from the service 110. The service 190 may issue responses 91A to requests 21A that indicate the success of the corresponding tasks 198A, and the higher-level operation 118A may be performed successfully using those responses. For example, the operation 118A may represent the dynamic building of a web page, and the responses 91A may include information usable to build the web page. Similarly, the service 190 may issue responses 91M to requests 21M that indicate the success of the corresponding tasks 198M, and the higher-level operation 118M may be performed successfully using those responses. In one embodiment, however, the service 190 may issue responses 91B to requests 21B that indicate the failure of the corresponding tasks 198B, and the higher-level operation 118B may not be performed successfully based (at least in part) on those responses. In one embodiment, the service 190 may not issue responses 91B to the requests 21B, and the higher-level operation 118B may fail based (at least in part) on a timeout of those requests. In one embodiment, the responses 9BA may include load shedding information such as the percentage of requests discarded by the downstream service 190, and such information may be used by the upstream service to decrease its request volume or rate. As shown in the examples of FIG. 2A and FIG. 2B, failures at a downstream service 190 may be coalesced around particular upstream operations so that the impact of load shedding at the downstream service is not magnified at the upstream service 110.

In one embodiment, the responses 91B may include a response code or other metadata indicating that the corresponding requests 21B should not be retried by the service 110. The presence of do-not-retry metadata in a response may be used by other services to distinguish between failures due to deliberate load shedding and other types of failures. If the do-not-retry metadata is respected, then the service 190 may be freed of additional overhead in rejecting additional requests for the same operation based on the consistent keyspace partitioning 192 and key-to-partition mapping 194 logic. In one embodiment, the responses 91B may be issued with a delay so that retries by the service 110 are reduced in number.

Figure 2C:
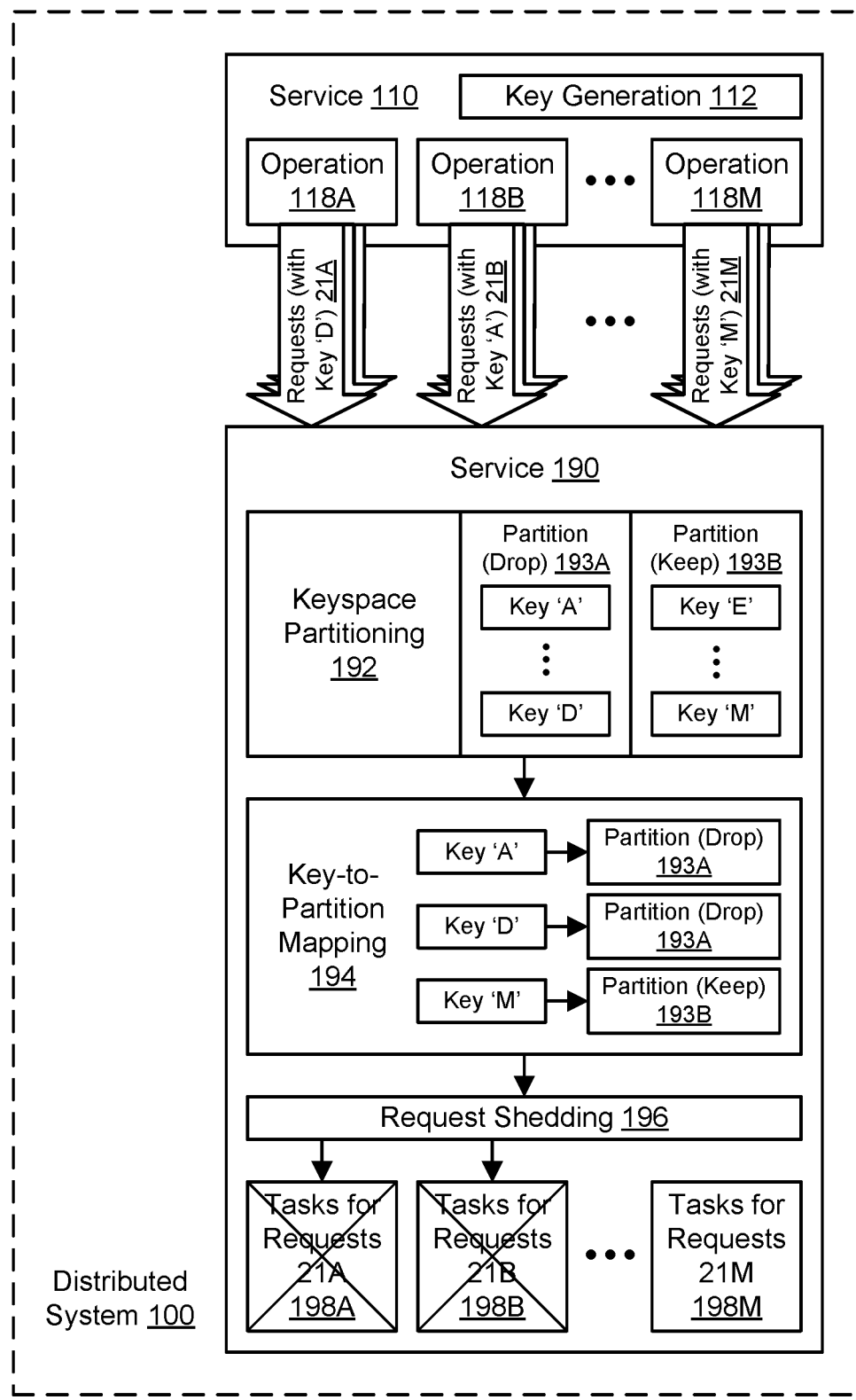
FIG. 2C illustrates further aspects of the example system environment for failure isolation in a distributed system, including the mapping of multiple keys into a partition of key values to be deliberately shed, according to one embodiment.

FIG. 2C illustrates further aspects of the example system environment for failure isolation in a distributed system, including the mapping of multiple keys into a partition of key values to be deliberately shed, according to one embodiment. The sizes of the partitions 193A and 193B may vary over time, e.g., based (at least in part) on the amount of traffic that is observed or anticipated at the downstream service 190 or on other performance metrics associated with the downstream service. In one embodiment, the intelligent request shedding may be initiated based (at least in part) on usage that exceeds a predetermined threshold, and the size of the "drop" partition 193A may vary based on the usage and threshold. For example, if the usage exceeds the threshold by 2%, then a range of keys representing 2% of potential keys may be selected for load shedding. The size of the "drop" partition 193A may grow or shrink as conditions change in the system 100, or the load shedding may be disabled entirely if a traffic surge subsides. As shown in the example of FIG. 2C, the partition 193A of potential key values to be subjected to request shedding 196 may be expanded to include key 'A' through key 'D.' Consequently, the tasks 198A corresponding to requests 21A as well as the tasks 198B corresponding to requests 21B may be deliberately shed and thus may not be performed.

Figure 2D:
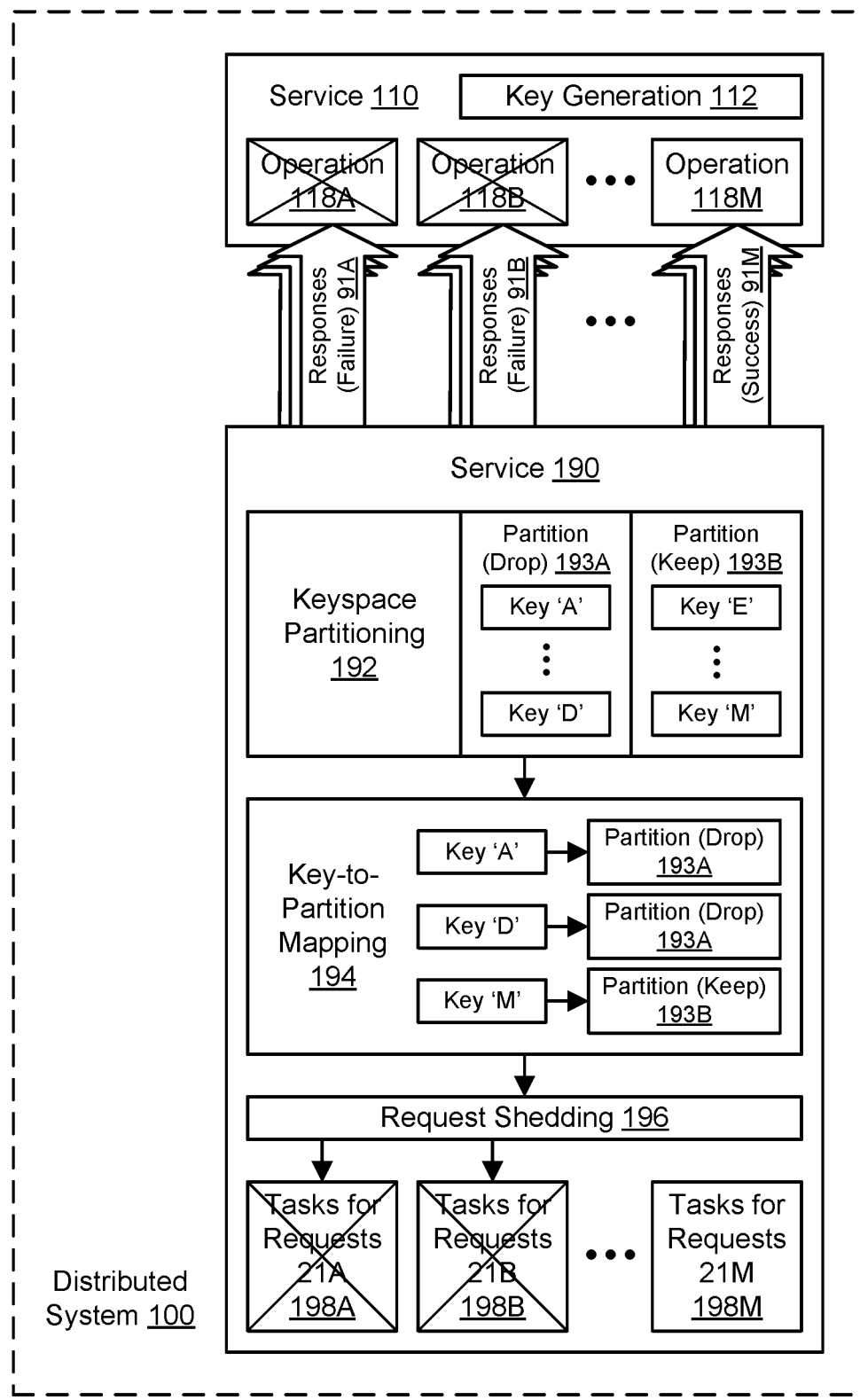
FIG. 2D illustrates further aspects of the example system environment for failure isolation in a distributed system, including the isolation of failure at a higher level to a limited set of operations based (at least in part) on the key mapping, according to one embodiment.

FIG. 2D illustrates further aspects of the example system environment for failure isolation in a distributed system, including the isolation of failure at a higher level to a limited set of operations based (at least in part) on the key mapping, according to one embodiment. As discussed above, the service 190 may issue responses 91M to requests 21M that indicate the success of the corresponding tasks 198M, and the higher-level operation 118M may be performed successfully using those responses. However, the service 190 may issue responses 91A to requests 21A that indicate the failure of the corresponding tasks 198A, and the higher-level operation 118A may not be performed successfully based (at least in part) on those responses. Similarly, the service 190 may issue responses 91B to requests 21B that indicate the failure of the corresponding tasks 198B, and the higher-level operation 118B may not be performed successfully based (at least in part) on those responses. As shown in FIG. 2C and FIG. 2D, higher-level failures may again be limited even though a higher percentage of lower-level tasks are allowed to fail deliberately.

Figure 3:
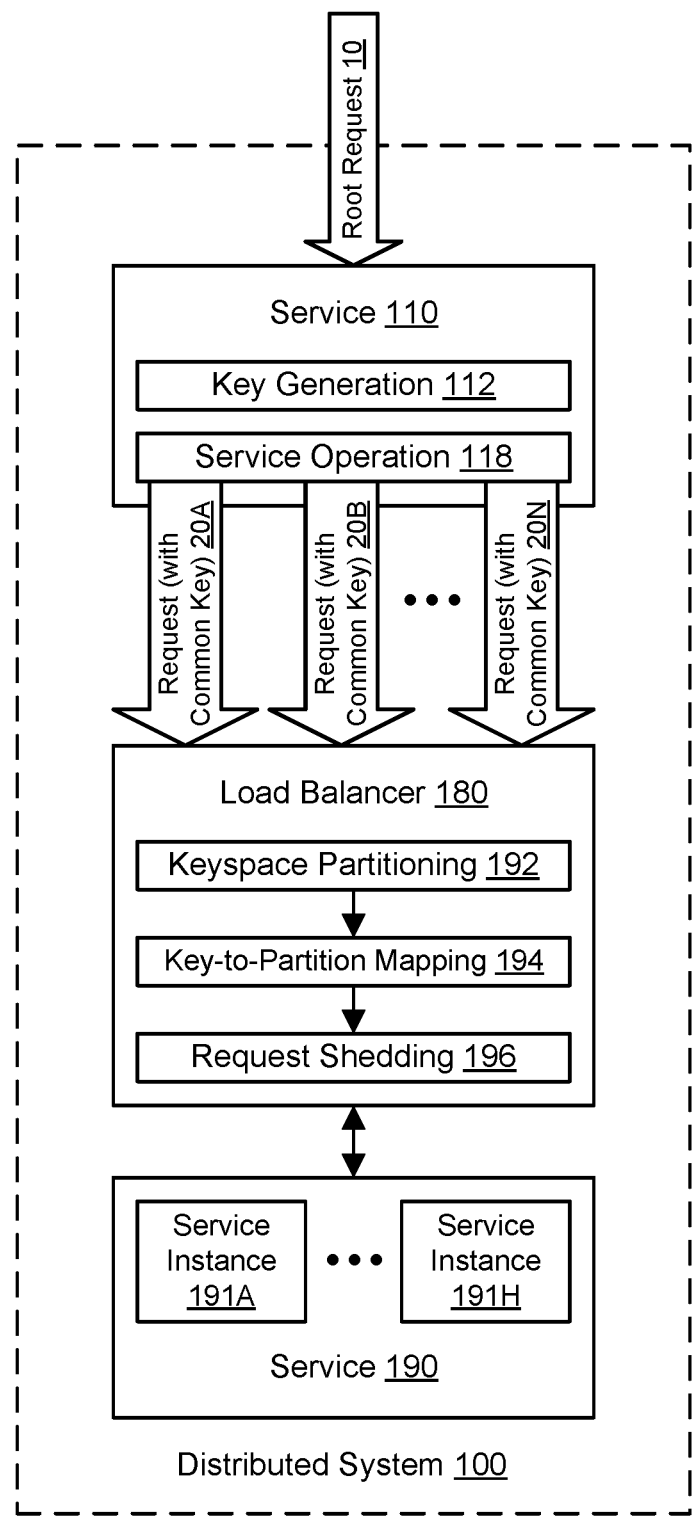
FIG. 3 illustrates further aspects of the example system environment for failure isolation in a distributed system, including the use of a load balancer to perform request shedding based (at least in part) on selection from a sorted list of keys, according to one embodiment.

FIG. 3 illustrates further aspects of the example system environment for failure isolation in a distributed system, including the use of a load balancer to perform request shedding based (at least in part) on selection from a sorted list of keys, according to one embodiment. In one embodiment, a load balancer 180 (or fleet of load balancers) may manage traffic for a set of service instances 191A-191H that each implement the functionality of the service 190. For example, a load balancer 180 may select a service instance for a particular request and route the request to the selected instance. In one embodiment, the keyspace partitioning 192, key-to-partition mapping 194, and/or request shedding 196 may be performed by the load balancer(s) 180. By implementing failure isolation using the load balancer(s), the service 190 may be freed of the overhead of performing the keyspace partitioning 192, key-to-partition mapping 194, and/or request shedding 196, and thus the availability of the service 190 (via its various service instances 191A-191H) may be improved. In one embodiment, the keyspace partitioning 192, key-to-partition mapping 194, and/or request shedding 196 may be offloaded in a similar manner to another component external to the service 190, such as a router.

Figure 4:
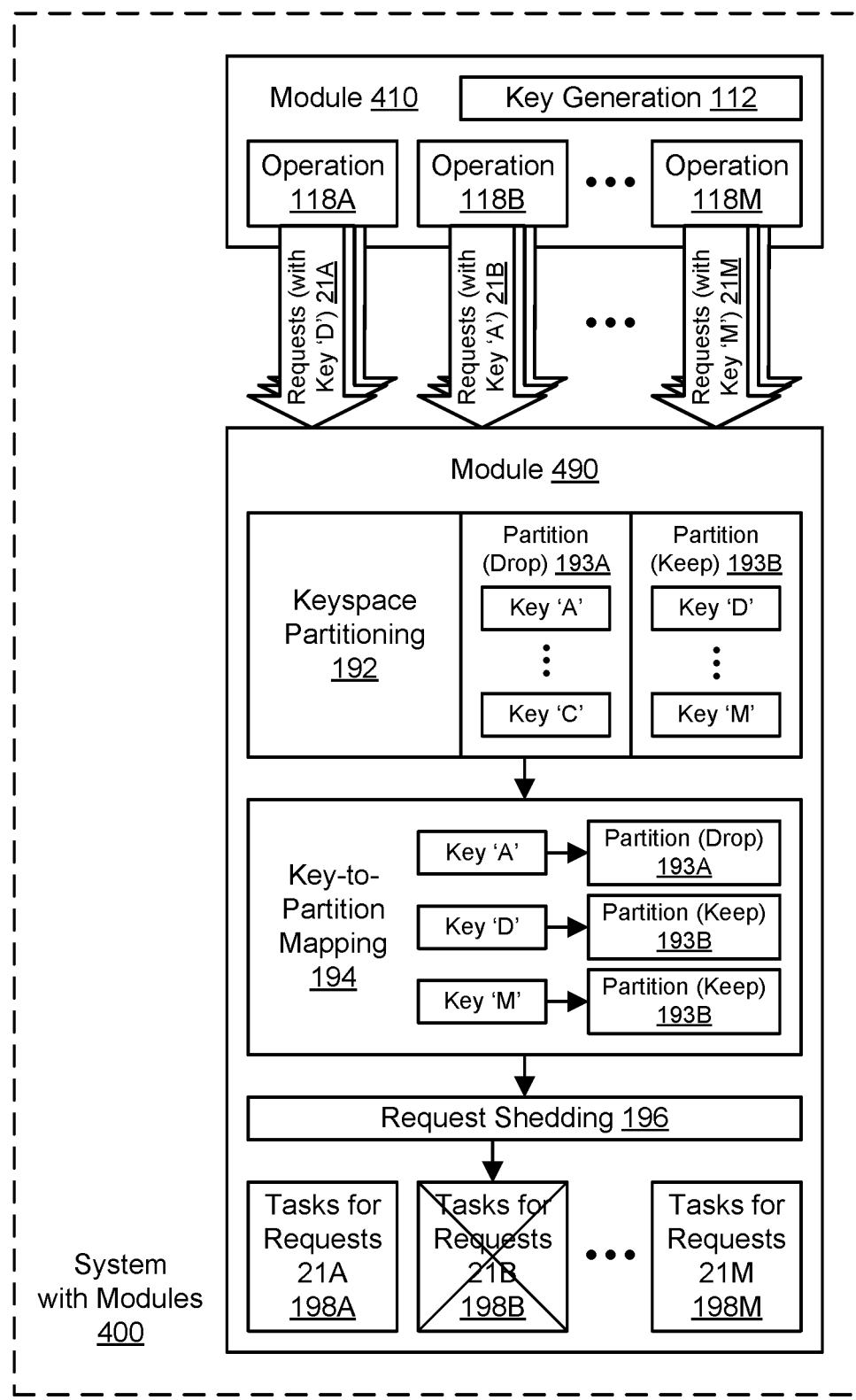
FIG. 4 illustrates an example system environment for failure isolation in a system having modules, according to some embodiments.

FIG. 4 illustrates an example system environment for failure isolation in a system having modules, according to some embodiments. In one embodiment, the techniques described herein for failure isolation may be performed in a system 400 that has modules that interact or collaborate to perform tasks. A module may include executable program instructions for performing one or more tasks. The modules may represent different processes in one or more applications running on one or more computing devices. The modules may not necessarily offer service interfaces like services 110, 150, and 190 but may nonetheless be able to issue requests or calls to other modules to invoke the functionality of those other modules. For example, a higher-level or upstream module 410 may generate a set of requests 21A (with common key 'D') for a higher-level operation 118A, a set of requests 21B (with common key 'A') for a higher-level operation 118B, and a set of requests 21M (with common key 'M') for a higher-level operation 118M. The requests or calls 21A-21M may be delivered to a lower-level or downstream module 490 via any suitable channel, including the use of network-based message passing, interprocess communication within a computer system, remote procedure calls (RPC), and so on. As discussed above with respect to FIG. 2A, the module 490 may perform keyspace partitioning 192, key-to-partition mapping 194, and request shedding 196. Consequently, the operation 118B may fail while the remaining operations 118A and 118M succeed. In various embodiments, any of the techniques described herein for failure isolation and intelligent request shedding may be performed using modules rather than services in a distributed system.

Figure 5:
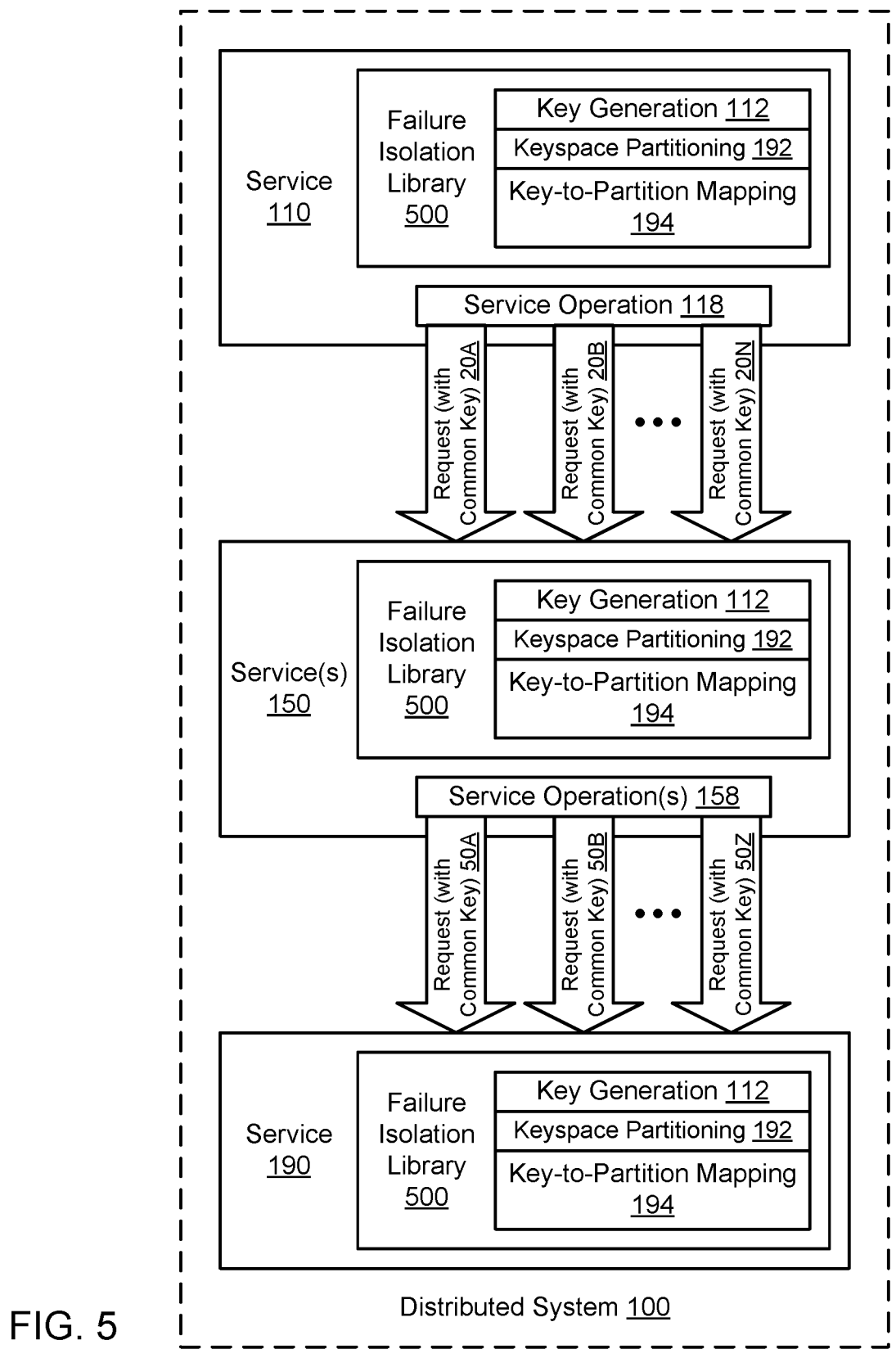
FIG. 5 illustrates further aspects of the example system environment for failure isolation in a distributed system, including the use of a library to perform request shedding based (at least in part) on keyspace partitioning and key-to-partition mapping, according to one embodiment.

FIG. 5 illustrates further aspects of the example system environment for failure isolation in a distributed system, including the use of a library to perform request shedding based (at least in part) on keyspace partitioning and key-to-partition mapping, according to one embodiment. In one embodiment, techniques associated with failure isolation may be provided by a failure isolation library 500. For example, the library 500 may implement functions for the key generation 112, keyspace partitioning 192, and key-to-partition mapping 194. The library 500 may be used by various services at various layers in the distributed system 100, including the service 110, service(s) 150, and/or service 190. In one embodiment, to perform keyspace partitioning 192 and key-to-partition mapping 194, the library 500 may take as input the root request ID or operation-specific key and the percentage of load shedding to be performed. By utilizing the same library 500 at different services, consistent logic may be used throughout the system 100 for key generation 112, keyspace partitioning 192, and key-to-partition mapping 194. In one embodiment, the failure isolation library 500 may be used by a load balancer or router in a similar manner as illustrated in FIG. 5, e.g., such that the failure isolation library makes a determination as to whether particular requests should be dropped by the load balancer or router.

Figure 6:
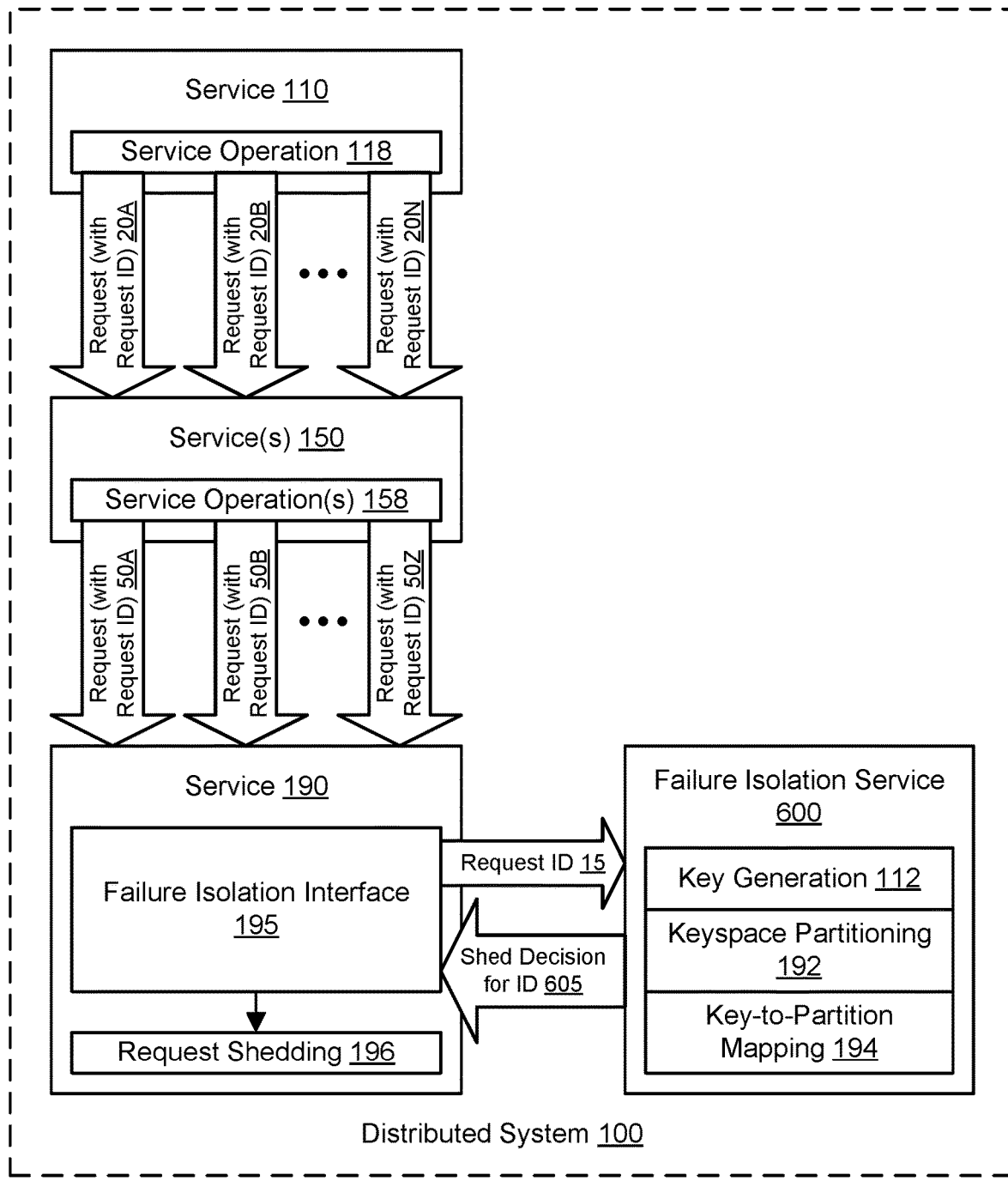
FIG. 6 illustrates further aspects of the example system environment for failure isolation in a distributed system, including the use of an external service that determines requests to be shed based (at least in part) on keyspace partitioning and key-to-partition mapping, according to one embodiment.

FIG. 6 illustrates further aspects of the example system environment for failure isolation in a distributed system, including the use of an external service that determines requests to be shed based (at least in part) on keyspace partitioning and key-to-partition mapping, according to one embodiment. In one embodiment, techniques associated with failure isolation may be offloaded to a failure isolation service 600. Instead of generating sortable per-operation keys and passing those keys in-band with requests 20A-20N and 50A-50Z, upstream services may issue requests with their usual metadata such as request IDs, timestamps, and so on. A set of requests associated with the same higher-level operation 118 may share the same root request ID. To inform request shedding at a downstream service 190, the downstream service may include a failure isolation interface 195 that invokes the failure isolation service 600 for particular requests or request IDs. In one embodiment, the interface 195 may be used to send a request ID 15 (e.g., an identifier of the root request for the operation 118) or other suitable metadata to the external service 600. In one embodiment, the service 600 may take as input the root request ID (or operation-specific key) and the percentage of load shedding to be performed. Based on that input, the service 600 may perform key generation 112, keyspace partitioning 192, and key-to-partition mapping 194 from the sorted list to determine whether or not the provided request ID 15 (or key) should be deliberately shed. The failure isolation service 600 may respond to the failure isolation interface with a decision 605 to shed or not to shed the request(s) corresponding to the supplied ID 15. The downstream service 190 may then perform request shedding 196 if indicated by the failure isolation service.

In one embodiment, the key may be generated by the upstream service 110 and passed with the requests 20A-20N and 50A-50Z, and the downstream service 190 may provide the key to the failure isolation service 600 instead of the request metadata usable to generate the key. To enable clients to invoke its functionality, the service 600 may expose any suitable interface(s), such as one or more APIs or other programmatic interfaces and/or graphical user interfaces (GUIs). In one embodiment, the functionality of the service 600 may be offered to clients in exchange for fees. In one embodiment, the failure isolation service 600 may interact with a load balancer or router in a similar manner as illustrated in FIG. 6, e.g., such that the failure isolation service makes a determination as to whether particular requests should be dropped by the load balancer or router.

Figure 7:
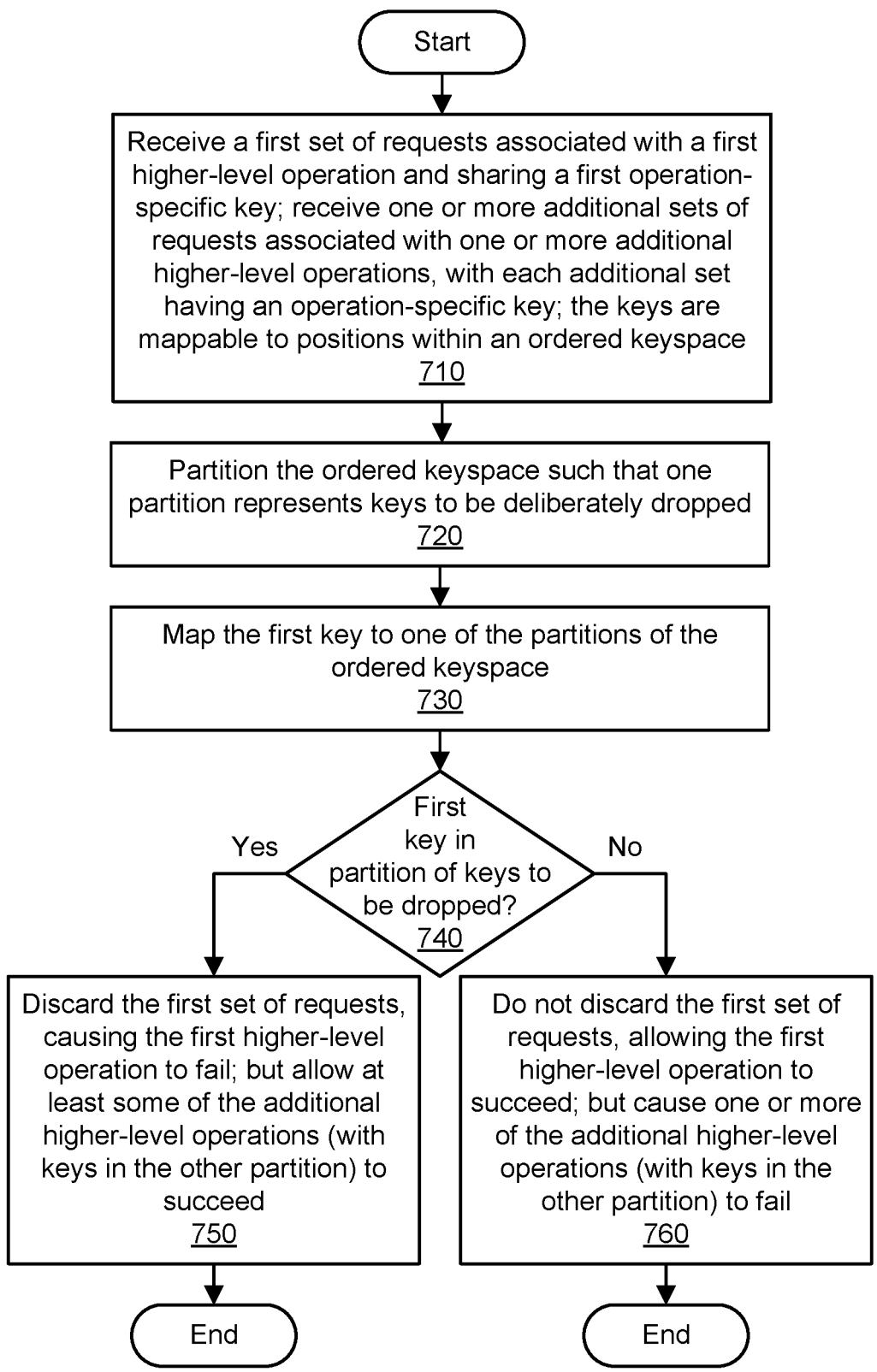
FIG. 7 is a flowchart illustrating a method for failure isolation in a distributed system, according to one embodiment.

FIG. 7 is a flowchart illustrating a method for failure isolation in a distributed system, according to one embodiment. As shown in 710, a first set of requests may be received, e.g., by a service or load balancer associated with that service. The first set of requests may correspond to a first higher-level operation and may share a first key specific to the first operation. For example, the first key may be generated as a hash of a root request ID or by extracting a segment of the root request ID. The value of the first key may have a position within an ordered keyspace of potential key values. The same service or load balancer may also receive one or more additional sets of requests may be received. Each of the additional sets may correspond to an additional higher-level operation and may share an operation-specific key. The values of the additional keys may have their own positions within the ordered keyspace of potential key values. The various requests to the downstream service may originate from an upstream or higher-level service in a service-oriented system. The higher-level operations that the upstream service seeks to perform may be dependent on the successful completion of the requests to the downstream service. For example, the upstream service may be configured to build a web page or a portion of a web page, e.g., as part of an online store that offers descriptions of goods and services for sale or lease, and the requests may seek to obtain information with which the web page can be built.

When the service or load balancer receives a request, the service may use the key associated with the request to decide whether or not to deliberately shed the request. As shown in 720, the keyspace may be partitioned into two or more partitions, such as one partition representing requests to be deliberately dropped and another partition representing requests to be attempted. The keyspace partitioning may be performed before or after requests are received. A key may be mapped to a position within the keyspace and thus to a particular partition of that keyspace. The sizes of the partitions or the position of the partition boundary within the keyspace may vary based (at least in part) on the amount or percentage of requests to be shed deliberately. For example, if 2% of requests are needed to be shed to maintain availability of the service for the remainder of the requests, then the top 2% of potential key values in the ordered keyspace or the bottom 2% of potential key values in the ordered keyspace may be partitioned off from the remainder of the potential values in the keyspace. As shown in 730, the first key may be mapped to one of the partitions of the ordered keyspace.

As shown in 740, the method may determine whether the first key was mapped to the partition of key values to be dropped. If so, then as shown in 750, the first set of requests may be discarded by the recipient service or load balancer without performing the corresponding tasks. This deliberate request shedding may cause the first higher-level operation to fail. However, by coalescing and isolating the failures to one or more particular higher-level operations, the request shedding may allow at least some of the additional higher-level operations (e.g., in the partition of keys to be kept) to succeed. If the first key was not mapped to the partition of key values to be dropped, then as shown in 760, tasks corresponding to the first set of requests may be performed by the recipient service, and the first higher-level operation may succeed. However, one or more of the additional higher-level operations may fail due to deliberate request shedding for other keys that were mapped to the "drop" partition. Using prior approaches, a small degradation of availability at the downstream service could cause a much larger degradation of availability at upstream services due to the one-to-many relationship of upstream operations to downstream tasks associated with those operations. Using the techniques shown in FIG. 7, such higher-level failures may be limited by coalescing failures at a lower level of the dependency chain. For example, if the downstream service has to drop 2% of requests due to heavy traffic, then those requests may be selected intelligently rather than pseudo-randomly, such that approximately 2% of higher-level operations will fail at the upstream service instead of nearly all of the higher-level operations.

Illustrative Computer System

In at least some embodiments, a computer system that implements a portion or all of one or more of the technologies described herein may include a computer system that includes or is configured to access one or more computer-readable media. FIG. 8 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 8 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
an upstream service in a distributed system, wherein the upstream service is configured to perform an operation associated with a key, wherein different invocations of the operation are associated with different key values, wherein the operation is dependent on a plurality of requests to one or more downstream services of the distributed system, and wherein the requests comprise the key; and
one or more processors and one or more memories to store computer-executable instructions that, if executed, cause the one or more processors to:
partition a keyspace into a first partition and a second partition, wherein the keyspace comprises an ordered set of potential key values, wherein the first partition represents one or more key values of requests to be subjected to deliberate request shedding, wherein the second partition represents one or more key values of requests to be excluded from the deliberate request shedding;
determine that the key value from the requests to the one or more downstream services for a given invocation of the operation is included in the first partition; and
cause the requests to the one or more downstream services to be discarded based at least in part on the first partition including the key value, wherein the operation associated with the key value fails at the upstream service.

2. The system as recited in claim 1, wherein a plurality of additional key values associated with a plurality of additional requests are mapped to the second partition, wherein the plurality of additional requests are attempted by the downstream service, and wherein a plurality of operations associated with the plurality of additional requests do not fail at the upstream service due to the deliberate request shedding at the downstream service.

3. The system as recited in claim 1, wherein the requests to the downstream service are discarded by the downstream service or by a load balancer associated with the downstream service.

4. The system as recited in claim 1, wherein the operation comprises generation of a web page, and wherein the downstream service comprises a data store that stores elements usable to generate web pages.

5. A method, comprising:
partitioning a keyspace into at least a first partition and a second partition, wherein the keyspace comprises an ordered set of potential key values;
initiating an operation, associated with a key value, at a first module in a system comprising a plurality of modules, wherein different invocations of the operation are associated with different key values, wherein the operation is dependent on a plurality of requests to one or more modules including a second module in the system, wherein the requests are associated with the key value, and wherein the key value corresponds to a position within the ordered set of potential key values; and
mapping the key value associated with the requests for the invoked operation to the first partition; and
discarding the requests to the second module based at least in part on the mapping, wherein the operation associated with the key value fails at the first module.

6. The method as recited in claim 5, wherein a size of the first partition and a size of the second partition are determined based at least in part on improving one or more performance characteristics of the system.

7. The method as recited in claim 5, wherein the requests to the second module are discarded by the second module or by a load balancer associated with the second module.

8. The method as recited in claim 5, wherein the requests to the second module comprise the key value.

9. The method as recited in claim 5, wherein the requests to the second module share a common identifier, wherein the common identifier is sent from the second module to a third module, and wherein the key value is determined at the third module based at least in part on the common identifier.

10. The method as recited in claim 5, wherein the key value is generated based at least in part on an identifier that identifies a request for the operation.

11. The method as recited in claim 5, wherein the key value indicates a lower priority of the operation, and wherein the requests are discarded based at least in part on the lower priority.

12. The method as recited in claim 5, wherein the operation is associated with a plurality of additional requests to a third module in the system, wherein the plurality of additional requests are associated with the key value, and wherein the method further comprises:
discarding the additional requests to the third module based at least in part on the mapping.

13. The method as recited in claim 5, further comprising:
sending, from the second module to the first module, one or more responses to the plurality of requests, wherein the one or more responses comprise do-not-retry metadata.

14. The method as recited in claim 5, further comprising:
sending, from the second module to the first module, one or more responses to the plurality of requests, wherein the one or more responses are sent with a delay, and wherein the delay reduces a rate of request retries at the first module.

15. The method as recited in claim 5, further comprising:
sending, from the second module to the first module, one or more responses to the plurality of requests, wherein the one or more responses comprise an indication of a percentage of requests discarded by the second module.

16. One or more non-transitory computer-readable storage media storing program instructions that, when executed on or across one or more processors, perform:
partitioning a keyspace into at least a first partition and a second partition, wherein the keyspace comprises an ordered set of potential key values, and wherein the second partition represents one or more key values to be subjected to deliberate request shedding;
initiating an operation, associated with a key value, at a first service in a distributed system, wherein different invocations of the operation are associated with different key values; wherein the operation is dependent on a plurality of requests to one or more services including a second service of the distributed system, and wherein the requests are associated with the key value;
mapping the key value associated with the requests for the invoked operation to the second partition; and
discarding the requests to the second service based at least in part on the mapping, wherein the operation associated with the key value fails at the first service.

17. The one or more non-transitory computer-readable storage media as recited in claim 16, wherein a size of the second partition is determined based at least in part on a service-level agreement associated with a latency of request processing.

18. The one or more non-transitory computer-readable storage media as recited in claim 16, wherein the key is generated based at least in part on an identifier that identifies a request for the operation.

19. The one or more non-transitory computer-readable storage media as recited in claim 16, wherein the operation is associated with a plurality of additional requests to a third service, wherein the plurality of additional requests are associated with the key, and wherein the storage media store further program instructions that, when executed on or across the one or more processors, perform:
   discarding the additional requests to the third service based at least in part on the mapping.

20. The one or more non-transitory computer-readable storage media as recited in claim 16, wherein the storage media store further program instructions that, when executed on or across the one or more processors, perform:
   sending, from the second service to the first service, one or more responses to the plurality of requests, wherein the one or more responses comprise do-not-retry metadata.

\* \* \* \* \*